No. 610,712. Patented Sept. 13, 1898.
T. W. KLOMAN.
APPARATUS FOR STARTING AND CONTROLLING ELECTRIC MOTORS.
(Application filed Apr. 4, 1898.)
(No Model.)
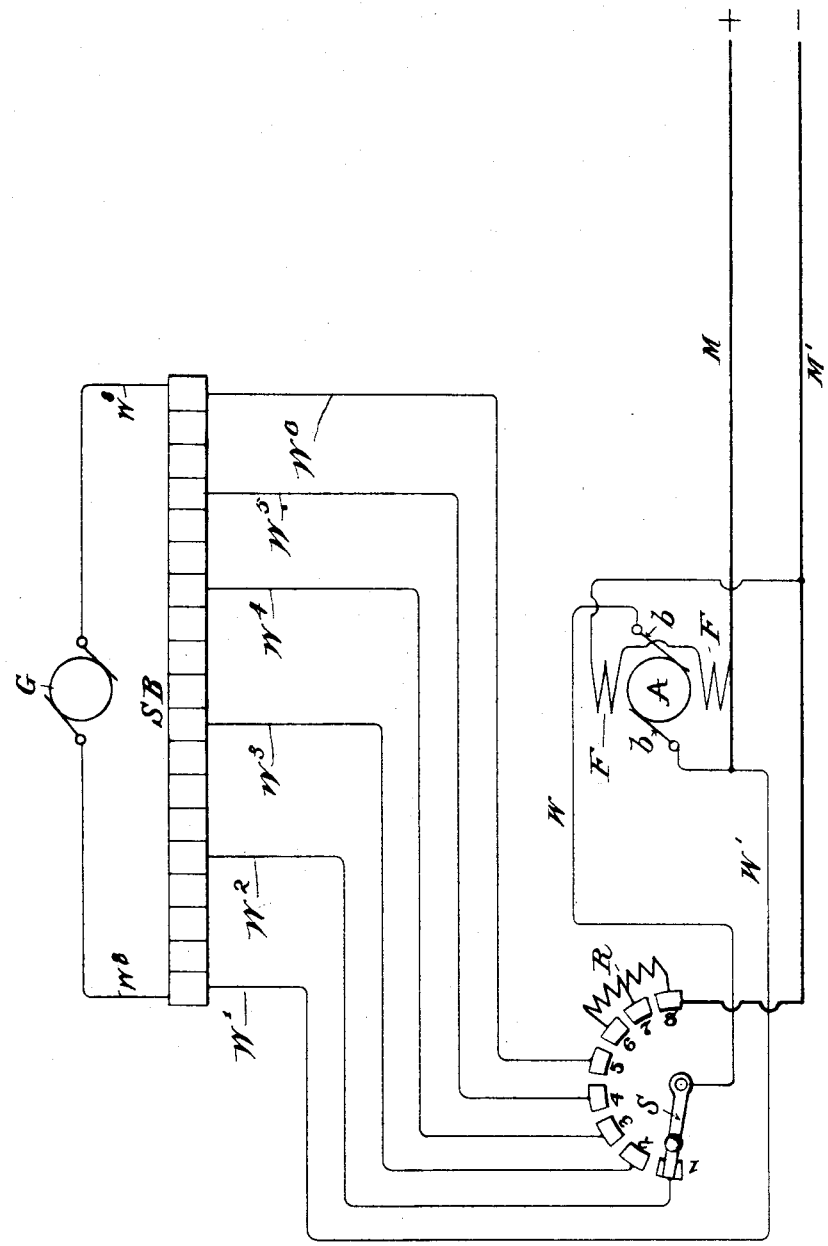

UNITED STATES PATENT OFFICE.

THEODORE W. KLOMAN, OF NEW YORK, N. Y.

APPARATUS FOR STARTING AND CONTROLLING ELECTRIC MOTORS.

SPECIFICATION forming part of Letters Patent No. 610,712, dated September 13, 1898.

Application filed April 4, 1898. Serial No. 676,497. (No model.)

*To all whom it may concern:*

Be it known that I, THEODORE W. KLOMAN, a citizen of the United States, residing at New York, in the county of New York and State of New York, have made a new and useful Invention in Mechanism or Apparatus for Starting and Controlling Electric Motors, of which the following is a specification.

My invention will be fully understood by referring to the accompanying drawing, which is a diagrammatic view illustrating an electric motor with my novel mechanism or apparatus connected thereto.

My invention has for its object to provide means for starting and controlling an electric motor under variable conditions of usage—as, for instance, in connection with printing-presses, elevators, and in similar places where it becomes necessary to adapt a motor to the peculiar conditions which prevail. To make a single illustration, it is found that in using electric motors to drive multiple-cylinder printing-presses it is first necessary to move the cylinders of the press slightly in order to adjust the type in position thereon, after which the requirements of the press are such that the paper as taken from the original roll must be woven or carried through between the various cylinders at a comparatively slow speed, and in this way a sufficient length of such paper is put in place to assure the printing of a complete paper in this type of press. After this is done the press is started at full speed, and my invention adapts an electric motor for use where these particular conditions are present.

It is also a well-known fact that in connection with elevators where electric motors are used as the motive power it is desirable that the motor should be started at a gradual speed, and for the purpose of effecting this result numerous devices have heretofore been invented which depend for their operation upon the manipulation of complicated switch mechanism and various other apparatus well known in the art. My invention contemplates the providing of a separate or independent source of electrical energy for furnishing the current to the armature in starting an electric motor, in combination with switching mechanism for varying the current to the armature until a maximum speed is required, when the current from the main source of electrical energy is then utilized to the exclusion of the current from the separate or starting source.

Referring now to the drawing in detail for a full and clear understanding of the invention, such as will enable others skilled in the art to construct and use the same, M and M' represent the main current conductors or leads running to a dynamo-electric machine or other main source of electrical energy. (Not shown.)

F and F represent the field-magnet coil or coils of the motor, which are permanently in circuit with the current-mains M and M'.

A represents the armature, and $b$ $b$ the commutator-brushes thereof.

S B represent a separate or independent source of electrical energy, preferably a storage battery, having a sufficient current capacity and voltage to furnish current for the motor under the varying conditions of load hereinbefore referred to.

$W'$ represents a current conductor or lead running from one of the commutator-brushes $b$ to one pole of the storage battery S B, and $W^6$ represents a corresponding current conductor or lead running from the other pole of said storage battery to a switch-contact 5, the same being one of a series of switch-contacts 1 2 3 4 to 8, inclusive, located at the extreme end of a pivoted switch-arm S.

$W^2$ $W^3$ $W^4$ $W^5$ represent branch current conductors or leads running from the switch-contacts 1 2 3 4 to intermediate parts of the storage battery S B. $W^8$ $W^8$ represent additional current mains or leads running from a dynamo-electric generator G, designed to keep the storage battery S B continuously charged. This generator G is kept running continuously either by a belt driven by the shaft of the armature A or it may be in the nature of a motor-generator driven by a branch current from the current mains or leads M M', there being provided means (not shown, but of any well-known nature) connected with the storage battery S B and current leads or conductors $W^8$ for automatically breaking the circuit of such current-generator when the storage battery is fully charged.

R represents a rheostat having its coils connected to the switch-contacts 6, 7, and 8, while the latter is connected by a current-conductor directly to one of the commutator-brushes $b$. The switch-arm S is connected at its pivoted end directly to a conductor or lead W, running to one of the commutator-brushes $b$.

The operation of my invention is as follows: Suppose it is desired to start the motor at a very slow speed. The free end of the switch-arm S is first put upon the contact-plate 1, so that the armature will receive current from the five cells of the battery connected between the current conductor or lead $W^2$ and branch conductor or lead $w'$, the current passing by way of the current conductor or lead $W'$ to the commutator-brush $b$, thence through the armature A to the second commutator-brush $b$, thence by branch conductor or lead W, switch-arm S, switching-contact 1, by the branch conductor $W^2$, to the starting-point.

Inasmuch as the field-magnet coil or coils are always in circuit with the current-leads M M' from the main source of electrical energy the field core or cores will always be saturated to full working capacity, so that whatever work is required of the armature A will depend in starting upon the current conditions attributable to the independent source of electrical energy in the nature of the storage battery S B, and these conditions are made variable in accordance with the positions of the switch-arm S, it being apparent that when the free end of said arm is advanced successively over the contacts 2, 3, 4, and 5 the armature will receive proportionately more current. Finally, when the armature has reached such a speed as will make it desirable to apply the main current source thereto the free end of the switch-arm S is transferred to the contact-point 6, thereby cutting out the independent source of electrical energy and causing the motor to run wholly by the main source of current-supply. As further speed is desired the arm S is advanced upon the contact 7 and finally to the contact 8, cutting out in succession the coils of the rheostat R, thus obtaining a maximum speed when the free end of the arm rests upon the contact 8. In like manner the motor may be slowed down by reversing the action of the switch-arm.

I do not limit myself to the especial details of structure herein shown and described, as I believe I am broadly entitled to claim an electric motor provided with two sources of current-supply, one of which is permanently connected with the field coil or coils of the motor, while the other is electrically independent of the first-named source of current-supply at all times and is provided with switching mechanism for connecting it directly to the armature-circuit in such manner as to vary the current relation therethrough in proportion to the demands put upon it (the armature) until the desired speed is attained, after which the independent source of current-supply is wholly disconnected from the armature and the main source of current-supply simultaneously connected thereto. By the term "separate or independent source of electrical energy" hereinbefore used and in the claims which follow I wish to be understood as meaning a source of electrical energy which is wholly electrically disconnected from the main source of current-supply at all times.

Having thus described my invention, what I claim, and desire to secure by Letters Patent of the United States, is—

1. An electric motor having its field coil or coils connected permanently in circuit with a main source of current-supply, in combination with an independent source of current-supply and switching mechanism for varying the current flow therefrom through the armature of the motor in accordance with the demands put upon it, together with additional circuit connections whereby the independent source of current-supply may be disconnected from the armature and the main source of current-supply substituted therefor, the arrangement being such that the independent source of current-supply is never electrically connected with the main source of current-supply substantially as described.

2. An electric motor having its field-magnet coil or coils connected permanently in circuit with a main source of current-supply, in combination with an independent source of current-supply provided with means for connecting it in circuit with the armature of the motor and varying the current relations therethrough, in accordance with the load put upon it, the arrangement being such that the independent source of current-supply is never electrically connected with the main source of current-supply substantially as described.

3. An electric motor having its field-magnet coil or coils connected permanently in circuit with a main source of current-supply, in combination with an independent source of current-supply, having circuit connections with the armature of the motor together with additional circuit connections whereby the first-named circuit connections may be ruptured and the main source of current-supply operatively connected with the armature after it, the armature, has reached a definite speed, the arrangement being such that the independent source of current-supply is never electrically connected with the main source of current-supply substantially as described.

4. An electric motor having its field-magnet coil or coils connected permanently in circuit with a main source of current-supply and its armature temporarily connected with an independent source of current-supply, in combination with switching mechanism and circuit connections for varying the current from the independent source, in accordance with the demands of the work put upon it, and circuit connections whereby the independent source of current-supply may be disconnected from, and the main source of current-supply connected to, the armature, substantially as described.

5. An electric motor having its field-magnet coil or coils connected permanently in circuit with a main source of current-supply and its armature temporarily connected with an independent source of current-supply, in combination with switch mechanism for varying the current-supply from the independent source and ultimately connecting the main source of current-supply with the armature, the arrangement being such that the independent source of current-supply is never electrically connected with the main source of current-supply substantially as described.

6. An electric motor having its field-magnet coil or coils connected permanently in circuit with a main source of current-supply and its armature connected with an independent source of current-supply, as a storage battery, in combination with a switch for varying the current relation thereof and ultimately connecting the main source of current-supply to said armature, together with an independent electrical generator adapted to keep the storage battery fully charged, substantially as described.

In testimony whereof I have hereunto subscribed my name this 11th day of March, 1898.

THEODORE W. KLOMAN.

Witnesses:
C. J. KINTNER,
M. T. KEATING.